W. WATSON.
BUCKET PLOW.
APPLICATION FILED MAY 12, 1919.

1,339,371.

Patented May 4, 1920.
3 SHEETS—SHEET 1.

INVENTOR
WILLIAM WATSON
BY
Edward B. Birkenbuel
ATTORNEY

UNITED STATES PATENT OFFICE.

WILLIAM WATSON, OF PORTLAND, OREGON.

BUCKET PLOW.

1,339,371.　　　　Specification of Letters Patent.　　Patented May 4, 1920.

Application filed May 12, 1919. Serial No. 296,509.

*To all whom it may concern:*

Be it known that I, WILLIAM WATSON, a citizen of the United States, residing in the city of Portland, county of Multnomah, and State of Oregon, have invented a certain new and useful Bucket Plow, of which the following is a specification.

My invention relates more particularly to a means for placing a seed bed in an ideal condition in the shortest time and at the lowest cost possible.

The principal objects of my invention may be enumerated as follows—The perfect plowing and breaking up or pulverization of all kinds and conditions of soils, the ariation of the soil, a complete mixing of the soil with the resident fertility as well as with any fresh application of soil building materials, the depositing of finely pulverized earth on top of undecayed fertilizer and trash, to avoid skips and dead furrows, to break up what is known as the plow sole to enable the agriculturist to concentrate his operations to the most favorable period and to apply the seed to the soil when it is in condition to promote early germination. The immediate seeding of the ground without again traversing same eliminates undesirable packing and consequent loss. The ability to plow rolling land by starting at the top and working downward is an object which is also attained by my device. The accomplishments of these objects as well as others of equal importance are set forth in the accompanying drawings and the specifications following.

Figure 3:
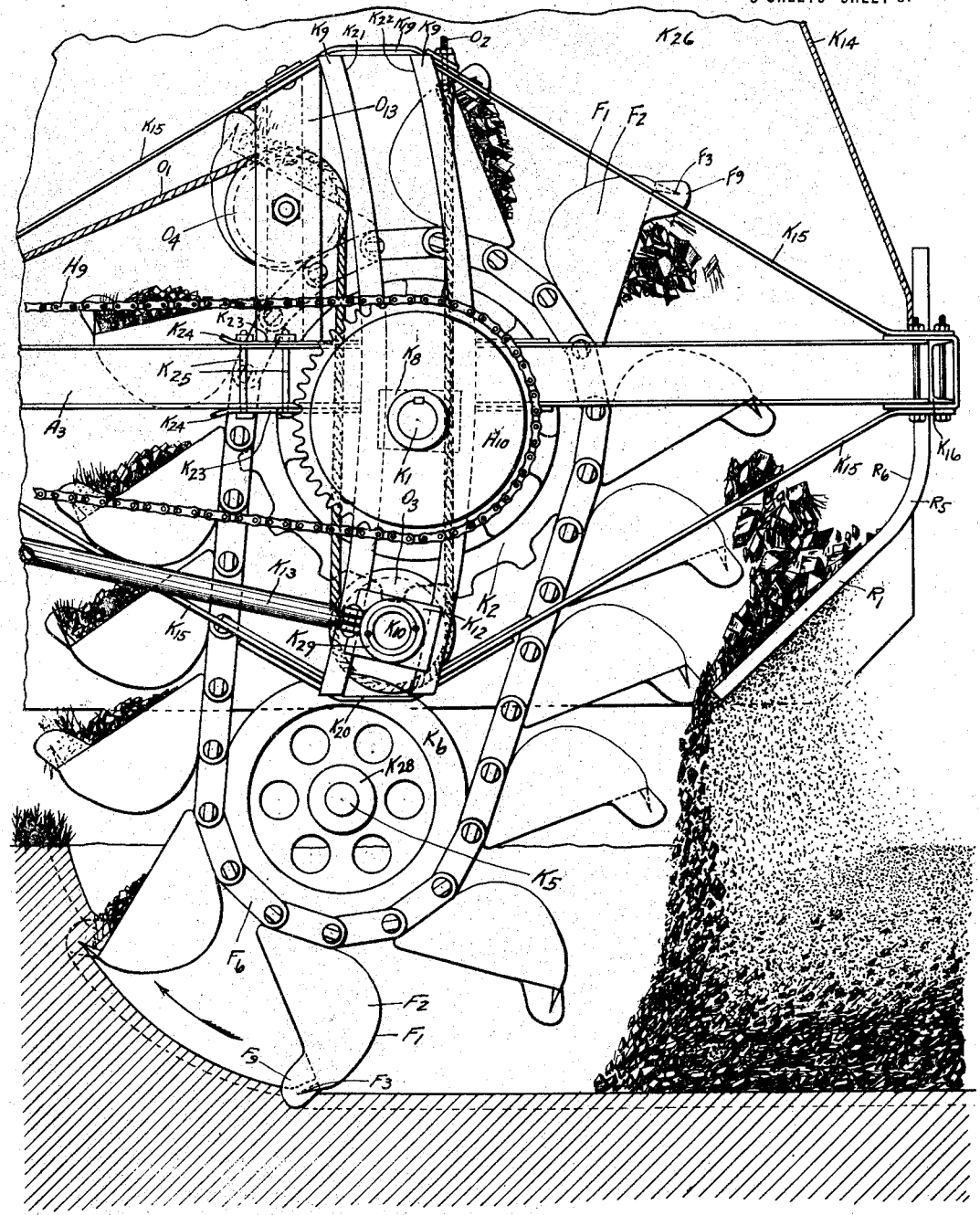
Figure 2:
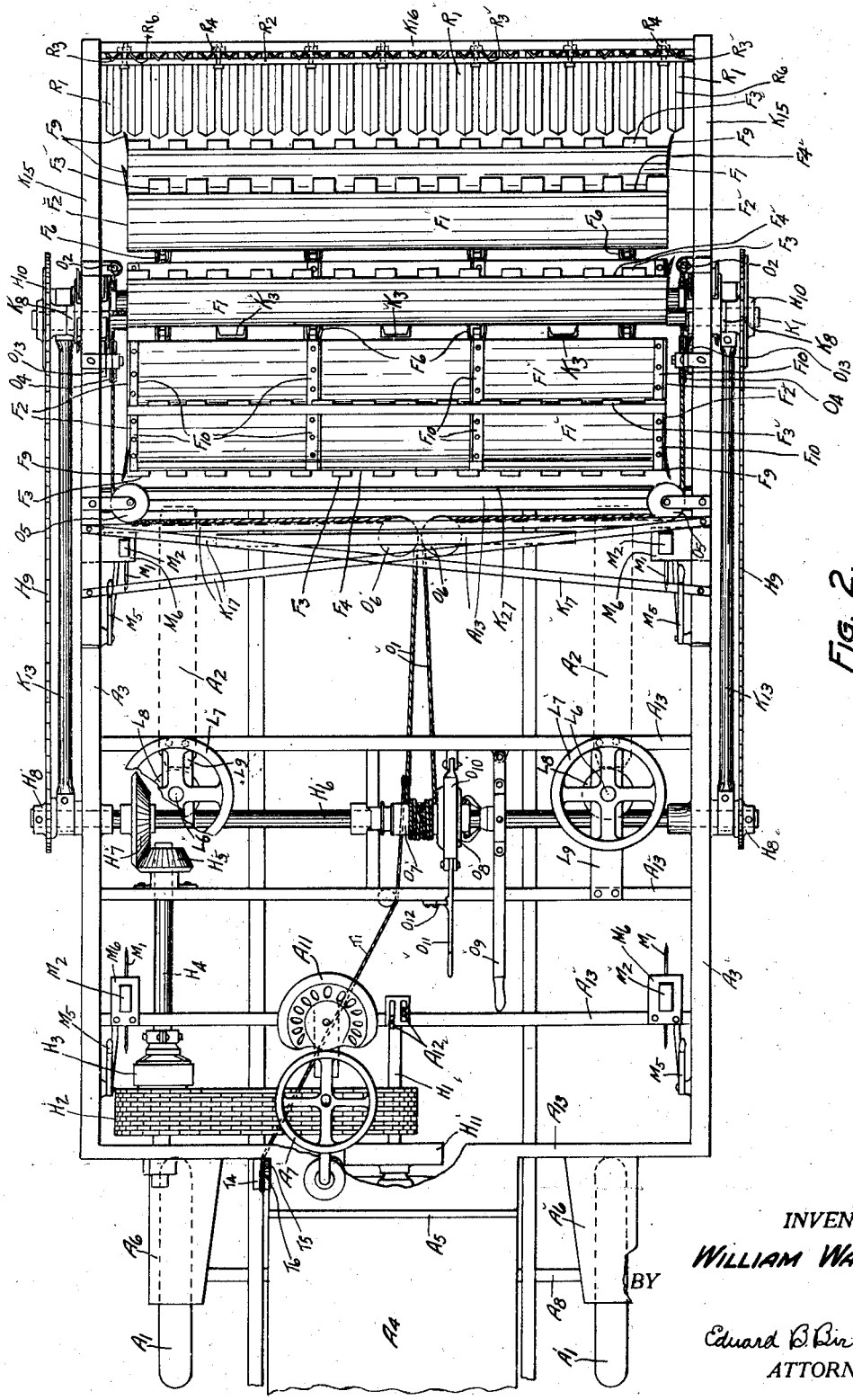
Figure 1:
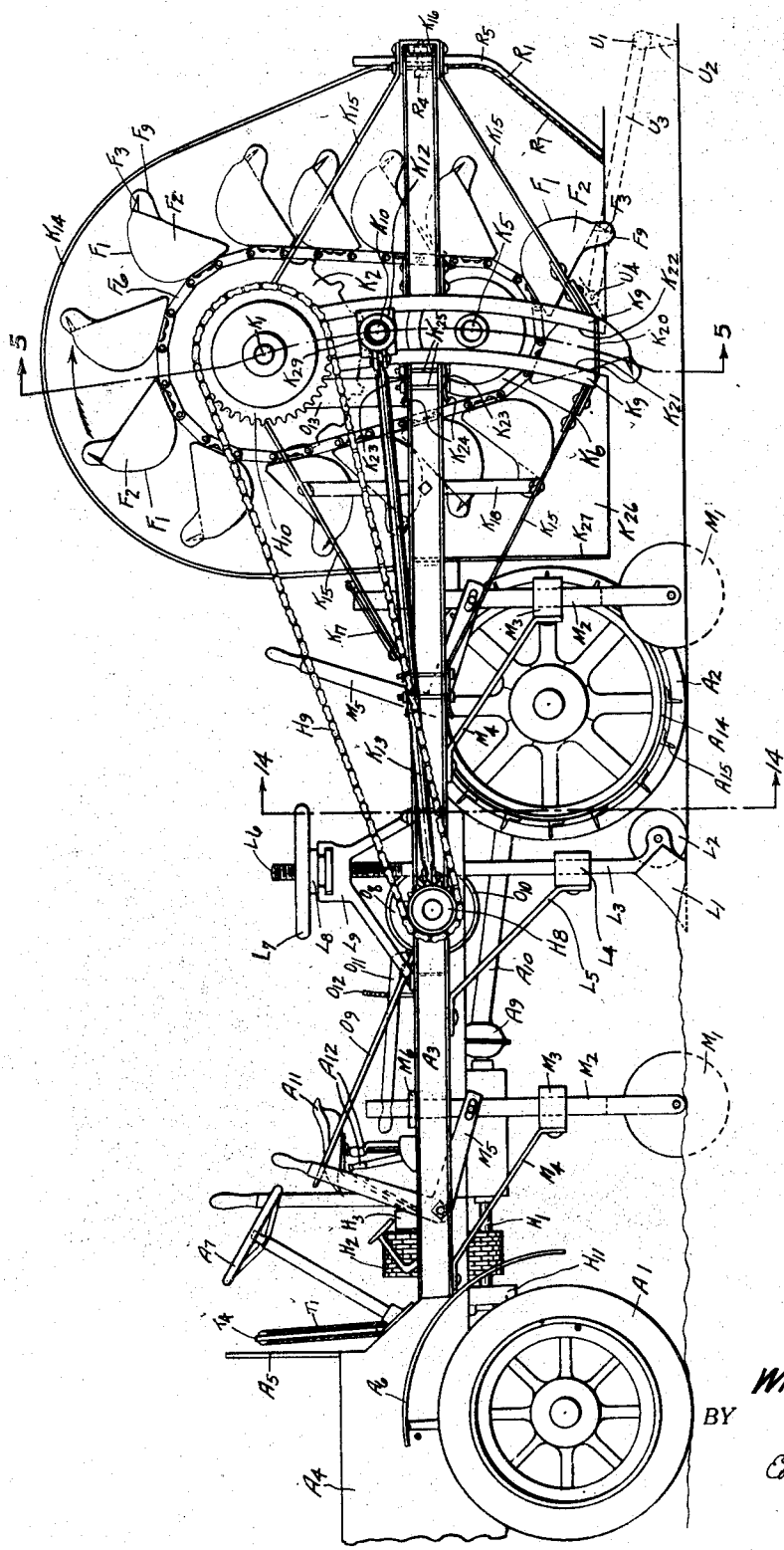

Referring to the drawings, Figure 1 is a side elevation of my invention with parts broken away for clearness; Fig. 2 is a plan view showing the decking and hood over plow removed to expose the operating parts; Fig. 3 is an enlarged elevation of the plow section of my invention and shows the action of the buckets upon the ground in their various positions and the resulting condition of the soil after it is again deposited by the machine.

Similar letters and numbers of reference refer to the same or similar parts throughout the several views.

The bucket plow which I am about to describe is mounted on the rear end of an automobile truck of which $A^1$ are the front wheels, $A^2$ the rear wheels and $A^3$ the truck frame. The usual form of engine is employed and is covered by the hood $A^4$. The dash $A^5$, the fenders $A^6$ and the steering wheel $A^7$ are those in common use. The front wheels $A^1$ are mounted on the front axle $A^8$. The universal joint $A^9$ transfers motion to the usual drive shaft which is contained in the tube $A^{10}$. $A^{11}$ is a seat which is placed near the driving levers $A^{12}$. The sides of the truck frame $A^3$ are tied together by the cross braces $A^{13}$. Provision against sinking into soft ground is made by supplying the rear wheels $A^2$ with the side flanges $A^{14}$ which are fitted with the ground grippers $A^{15}$.

The buckets $F^1$ which form the plow have closed ends $F^2$ and the serrated cutting edges $F^3$. To these bucket ends are attached side cutters which will be explained later.

The root of the teeth of the edge $F^3$ I shall designate as $F^4$. On each of the teeth of the cutting edge $F^3$ are mounted the subsoiling teeth $F^5$ which swing on a greater arc than do the outermost points of the cutting edge $F^3$. The buckets themselves are mounted upon the sprocket chains $F^6$ which are supplied with pads to which the buckets $F^1$ are secured by means of rivets. The side cutters before mentioned are referred to as $F^9$ and one of them will be found on each bucket and it will be observed that their position alternates from right to left on each succeeding bucket.

The engine shaft $H^1$ is connected by the link belt drive $H^2$ and the clutch $H^3$ to the intermediate drive shaft $H^4$ to which is secured the bevel pinion $H^5$ which drives the countershaft $H^6$ through the bevel gear $H^7$. On each end of the countershaft $H^6$ is secured a sprocket pinion $H^8$ which by means of the chain $H^9$ drives the sprocket wheel $H^{10}$. $H^{11}$ indicates the flywheel of the engine.

The plow proper consists of the upper plow shaft $K^1$ which is driven by the sprocket wheels $H^{10}$. On this shaft $K^1$ are also mounted the larger sprocket wheels $K^2$ which carry and drive the bucket carrying chain $F^6$. The shaft $K^1$ is mounted on the plow beams $K^3$ in the bearings $K^4$. The lower plow shaft $K^5$ is equipped with the toothless sprockets $K^6$ which carry the lower parts of the chains $F^6$ and are left smooth as they are not drivers and will be less liable to draw falling materials beneath the chains. Since the shaft $K^5$ does not need to rotate I have secured it to the plow beams $K^3$ by means of the clamps $K^7$. $K^8$ are bearings on the outboard end of the upper plow shaft $K^1$ which are adapted to slide within the curved guides $K^9$. The radius shaft $K^{10}$ is secured by the clamps $K^{11}$ to the center of the plow beams $K^3$ while near the outboard ends of the radius shaft $K^{10}$ are located the bearings $K^{12}$ which are also adapted to slide in the guide $K^9$ but much more loosely than do the bearings $K^8$ because the thrust on the radius shaft is taken by the radius rods $K^{13}$ which join the shaft $K^{10}$ to the common countershaft $H^6$. Over the plow is supported the curved hood $K^{14}$ which protects the plow and its contents from the action of the elements. The curved guide $K^9$ is stiffened by the braces $K^{15}$ while the rear of the truck frame is joined by the tie $K^{16}$. $K^{17}$ are cross braces between the upper forward braces $K^{15}$. $K^{18}$ are vertical braces between the forward braces $K^{15}$. The top of the curved guide $K^9$ is referred to as $K^{19}$ and the bottom as $K^{20}$. $K^{21}$ is the forward inside edge of $K^9$ and $K^{22}$ is the rearward inside edge of guide $K^9$. Lugs $K^{23}$ are secured to the guide $K^9$ in a manner that their bent ends $K^{24}$ will readily receive the ends of the truck frame when attaching the plow to the truck. The two are then fastened together by means of the bolts $K^{25}$. The sides of the plow are covered by the guards $K^{26}$. A guard $K^{27}$ is also placed in front of the buckets $F^1$. $K^{28}$ are collars on the shafts $K^1$ and $K^5$. $K^{29}$ are collars on the shaft $K^{10}$ and serve to retain the swinging ends of the radius rods $K^{13}$ to the radius shaft $K^{10}$.

In order to present a perfectly smooth track for the rear wheels of the truck which act as a depth gage for the plow, I have provided a track smoothing plow $L^1$ behind and slightly below which is located a track roller $L^2$, both of which are carried by the spindle $L^3$ whose lower end is held by the guide $L^4$ which in turn is held by the brace $L^5$. The upper end $L^6$ of the spindle $L^3$ is threaded to fit a tapped handwheel $L^7$ whose grooved hub $L^8$ is engaged by the standard $L^9$. It is evident that the vertical position of the track smoothing plow and roller on each side of the truck is entirely within the control of the operator of the hand wheel $L^7$.

For the purpose of guiding the plow and preventing sliding on a hillside, I have constructed the four guide wheels $M^1$ as shown which are carried by the spindles $M^2$ whose lower guide $M^3$ is held by the brace $M^4$. The spindles $M^2$ are operated vertically by the lever $M^5$ which is mounted on the truck frame and is connected to the spindle $M^2$ below the upper guide $M^6$.

The plow itself is operated vertically by means of the plow elevating cable $O^1$ which is joined by the eyebolt $O^2$ to the member $K^{15}$ and then passes around the grooved pulley $O^3$ on the shaft $K^{10}$, thence over the grooved pulley $O^4$ on the standard $O^{13}$, thence under the pulley $O^5$ on the brace $K^{15}$, thence around the pulley $O^6$ under the brace $A^{13}$, thence to the clutch drum on shaft $H^5$ whose clutch $O^8$ is operated by the lever $O^9$. The drum $O^7$ may be held in any desired position by the brake band $O^{10}$ whose operating lever $O^{11}$ may be held in any position by the ratchet bar $O^{12}$.

The pulverizing of the soil is accomplished by having the buckets $F^1$ discharge their loads against a screen composed of a plurality of angle bars $R^1$ set so that the dirt will strike the outside square corner. These bars are held in place by the clamp $R^2$ whose notches $R^3$ engage the angle bars which are then secured by the bolts $R^4$. The bend $R^5$ tends to form an incline of the angle bars. I will refer to the corner against which the dirt strikes as $R^6$. When it is desired to leave the ground in a rough state, the sheet metal guard $R^7$ is placed over the pulverizing bars as shown in Fig. 1. This will prevent all of the fine dirt from being deposited on top of the coarser materials and leaves them exposed to the action of the elements.

Behind the tie $K^{16}$ may be mounted the seeder $S^1$ which is driven by the chain $S^2$ which idles over the sprockets $S^3$ and is driven by the sprocket $S^4$ which is mounted on the countershaft $H^6$. The usual tubes $S^5$ are used to convey the seeds to the ground. $S^6$ is a brace for fastening the seeder $S^1$ to the braces $K^{15}$.

In order to enable the operator of the plow to accurately control the working depth of the plow I have supplied a depth gage which consists of a cable $T^1$ secured to the plow elevating cable $O^1$ in a manner to receive motion from same. It then passes under the idler pulley $T^2$ which is mounted on the pin $T^3$ and then upward in front of the standard $T^4$ whose face is divided by the graduations $T^5$ which represent inches of plow depth which is shown by the indicator $T^6$ which is fastened to the portion of the cable $T^1$ which passes in front of the graduations $T^5$. At the top of the standard $T^4$ is mounted the pulley $T^7$ over which the cable $T^1$ passes to the counterweight $T^8$ which is fitted with a slide $T^9$ which uses the standard $T^4$ as a guide.

In Fig. 1 I illustrate a means for providing a perfectly level surface behind the implement, which consists of a rake $U^1$ whose teeth $U^2$ are permitted to ride upon the surface of the freshly tilled soil, as its handles $U^3$ are pivoted at $U^4$ to the braces $K^{15}$.

Although I have shown the cutting edge of the buckets as one piece extending the full length of the bucket, it is apparent that these might be made in sections to facilitate their application and removal, without departing from the idea as illustrated in the drawings and described in the appended claims.

While I have thus described my invention it is not my object to limit myself to this precise form or method of application, but intend that it shall cover all forms and modifications that fall fairly within the appended claims.

What I claim as new and desire to protect by Letters Patent of the United States, is:

1. In a bucket plow, the combination of a vehicle having tractive power with a plow means mounted with its axes of rotation parallel to that of the rear axle of the vehicle and on the rearward end of vehicle, consisting of buckets mounted on sprocket chains and rotated in a manner to present a lifting cutting action against the earth at the rear of the vehicle, soil pulverizing bars positioned underneath the discharge of said buckets and sloping downward toward the front, a means for operating said plow independently of the vehicle having an interposed clutch, which means is adapted to furnish a power connection between the power means, a means for controlling the vertical position of a plow, and a track forming means consisting of a plow placed in front of the rear drive wheels and a roller secured behind said plow, same being adapted to pack the ground for said driving wheel.

2. In a plow, the combination of a plurality of buckets adapted to be rotated upwardly against the soil, a frame, shafting, sprocket wheels and chains for carrying said buckets, a means for rotating said buckets, a means for controlling the vertical position of the buckets consisting of a winch adapted to raise or lower the frame which carries said buckets and their related parts, and a means for preventing the pulverization of the soil consisting of an inclined surface against which the dirt is discharged from the buckets.

3. In a bucket plow, the combination of a vehicle having tractive power with a plow means mounted with its axes of rotation parallel to that of the rear axle of the vehicle and on the rearward end of the vehicle, consisting of buckets mounted on sprocket chains and rotated in a manner to present a lifting cutting action against the earth at the rear of the vehicle, soil pulverizing bars positioned underneath the discharge of said buckets and sloping downward to the front, a means for operating said plow independently of the vehicle, consisting of shafts, gears and chains having an interposed clutch, which means is adapted to furnish a power connection between the power means and the plow means, and a means for controlling the vertical position of the plow means.

WILLIAM WATSON.